Aug. 11, 1942.   L. P. MILLARD ET AL   2,292,958
HARVESTER THRESHER
Filed Sept. 25, 1940   5 Sheets-Sheet 1

Inventors
Lee P. Millard
and Stuart D. Pool
By Paul O. Pippel
Atty.

Aug. 11, 1942.   L. P. MILLARD ET AL   2,292,958
HARVESTER THRESHER
Filed Sept. 25, 1940   5 Sheets-Sheet 2

Inventors
Lee P. Millard
and Stuart D. Pool
By Paul O. Pippel Atty.

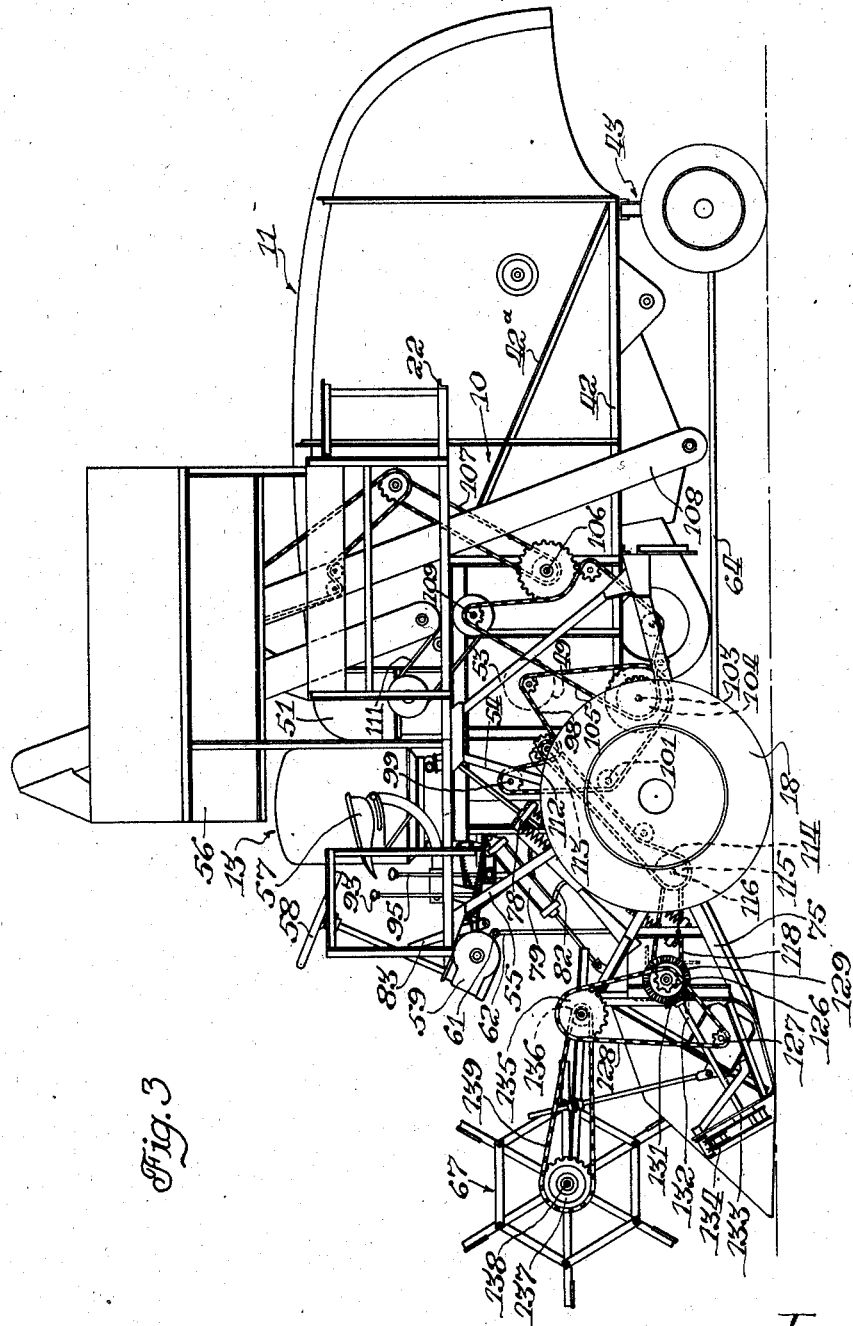

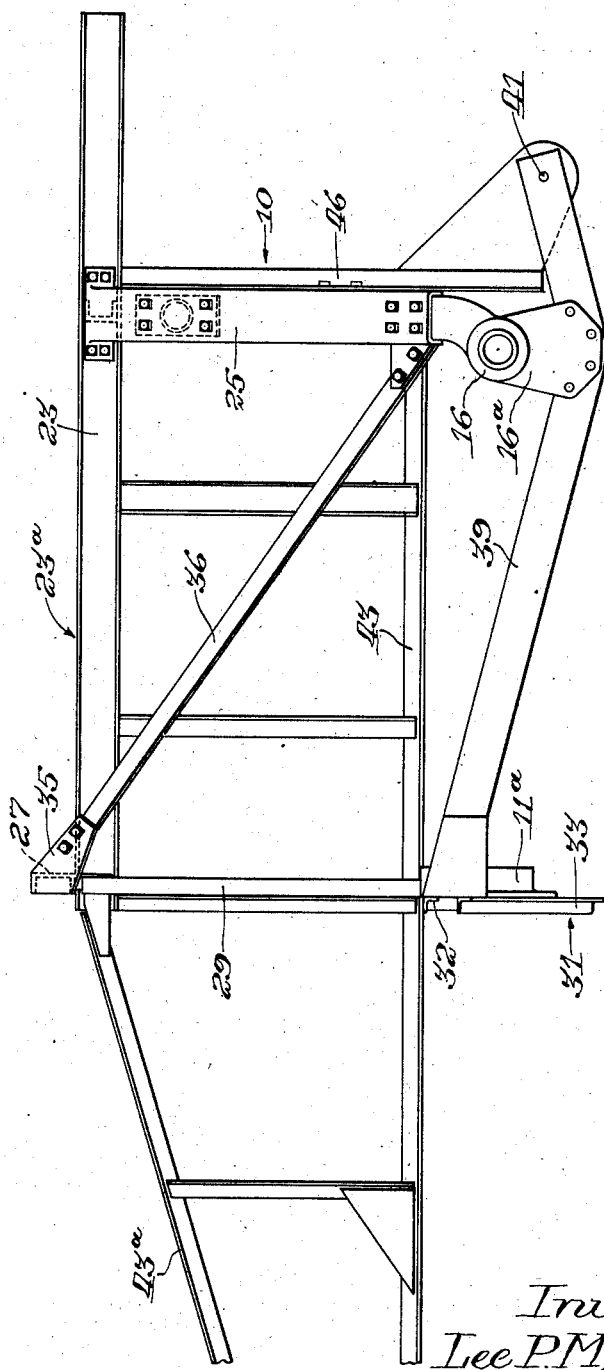

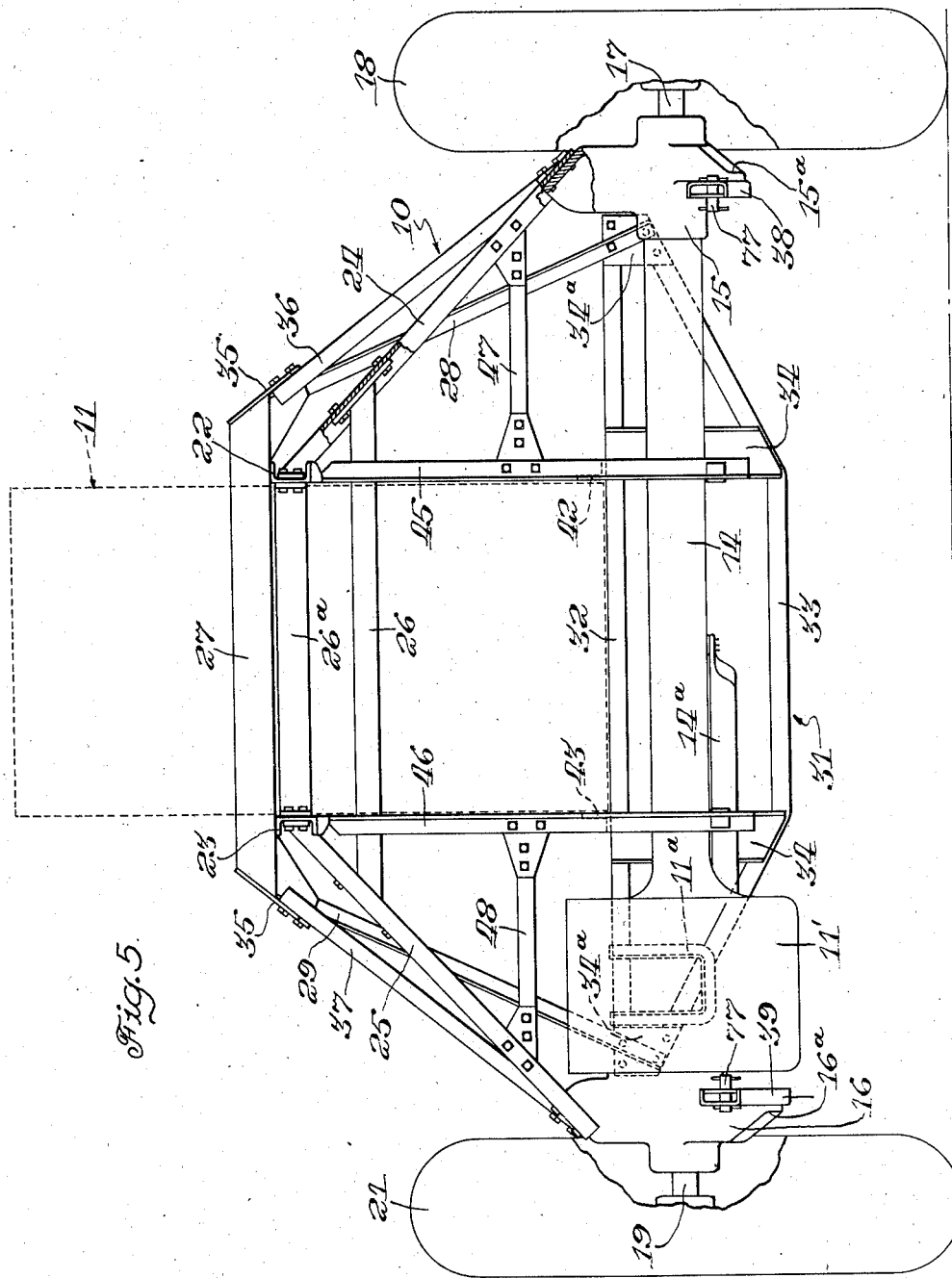

Patented Aug. 11, 1942

2,292,958

UNITED STATES PATENT OFFICE 2,292,958

HARVESTER-THRESHER

Lee P. Millard and Stuart D. Pool, Moline, Ill., assignors to International Harvester Company, a corporation of New Jersey Application September 25, 1940, Serial No. 358,256

11 Claims. (Cl. 56—21)

This invention relates to harvester threshers, and more particularly it relates to harvester threshers of the self-propelled type.

In this type of harvester thresher, a source of power is supplied on the harvester thresher which drives the various parts of the harvester thresher and also propels the harvester thresher over the ground. In a self-propelled type of harvester thresher, it is essential that the framework of the machine be constructed so as to support the separator, platform, grain tank, and motor of the harvester. Since the harvester thresher is self-propelled, a suitable transmission must be provided whereby the speed of the harvester thresher may be controlled, and it is also desirable that the drives to the various parts of the machine be as simple as possible.

It is, therefore, an important object of the present invention to provide an improved self-propelled harvester thresher.

Another object of the invention is to provide an improved frame structure for supporting the self-propelled type of harvester thresher.

Another object of the invention is to provide a novel means for driving the various parts of the harvester thresher.

Another object of the invention is to provide a novel drive from the motor to the cylinder and the transmission.

Another object of the invention is to provide an improved platform drive for a self-propelled harvester.

By virtue of these objects an improved harvester thresher is provided.

These and other objects and advantages of the present invention will be apparent to those skilled in the art after a consideration of the specific detailed description of the preferred structural embodiment taken in conjunction with the accompanying drawings.

In the drawings:

Figure 3 is a side view of the machine, shown in Figure 1, taken from the left side;

Figure 4 is a side view of the novel frame structure which supports the harvester thresher; and, Figure 5 is a front view of the novel frame structure.

Figure 1:
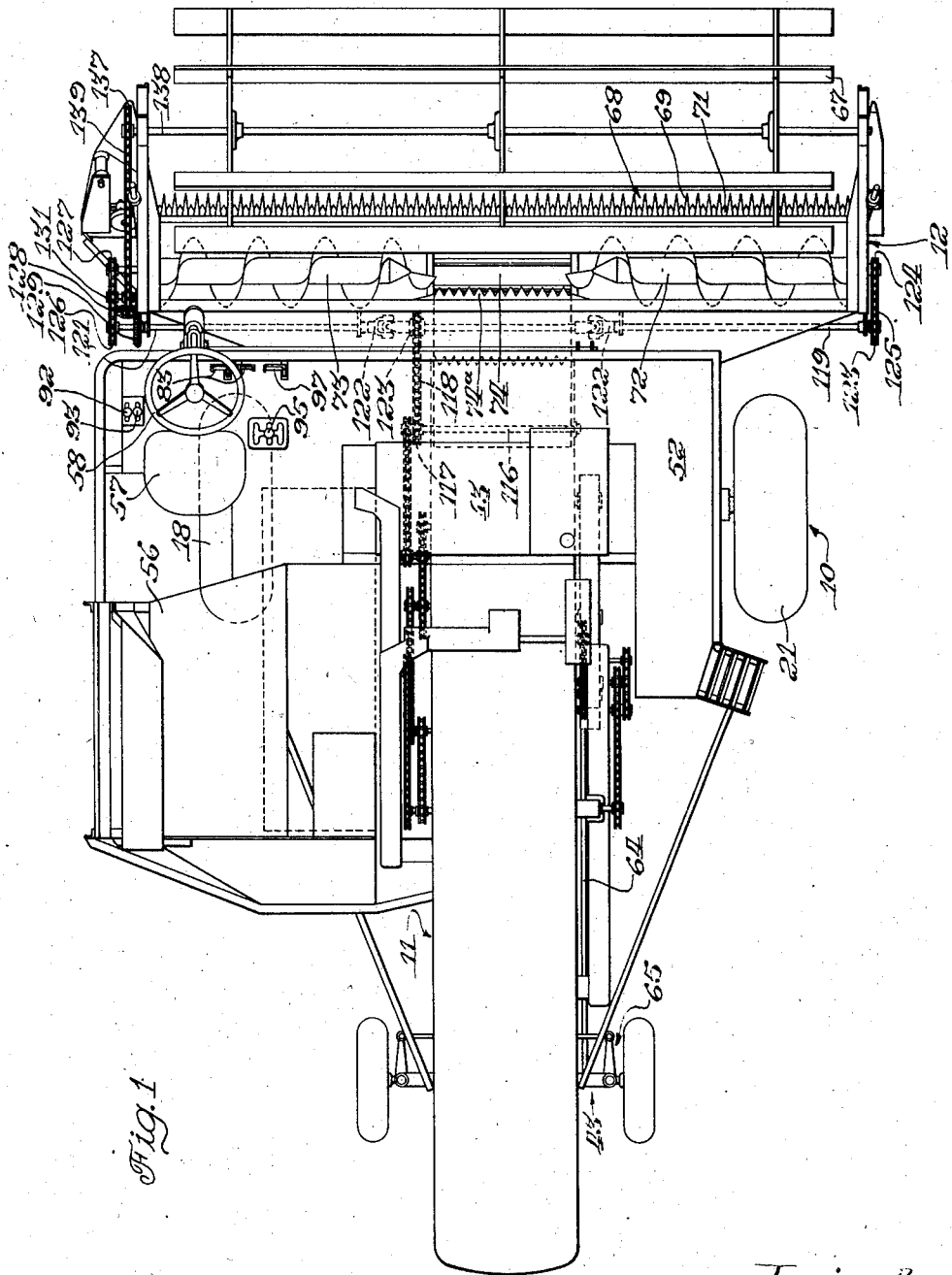
Figure 1 is a top view of a self-propelled harvester thresher embodying the features of the present invention.
Figure 2:
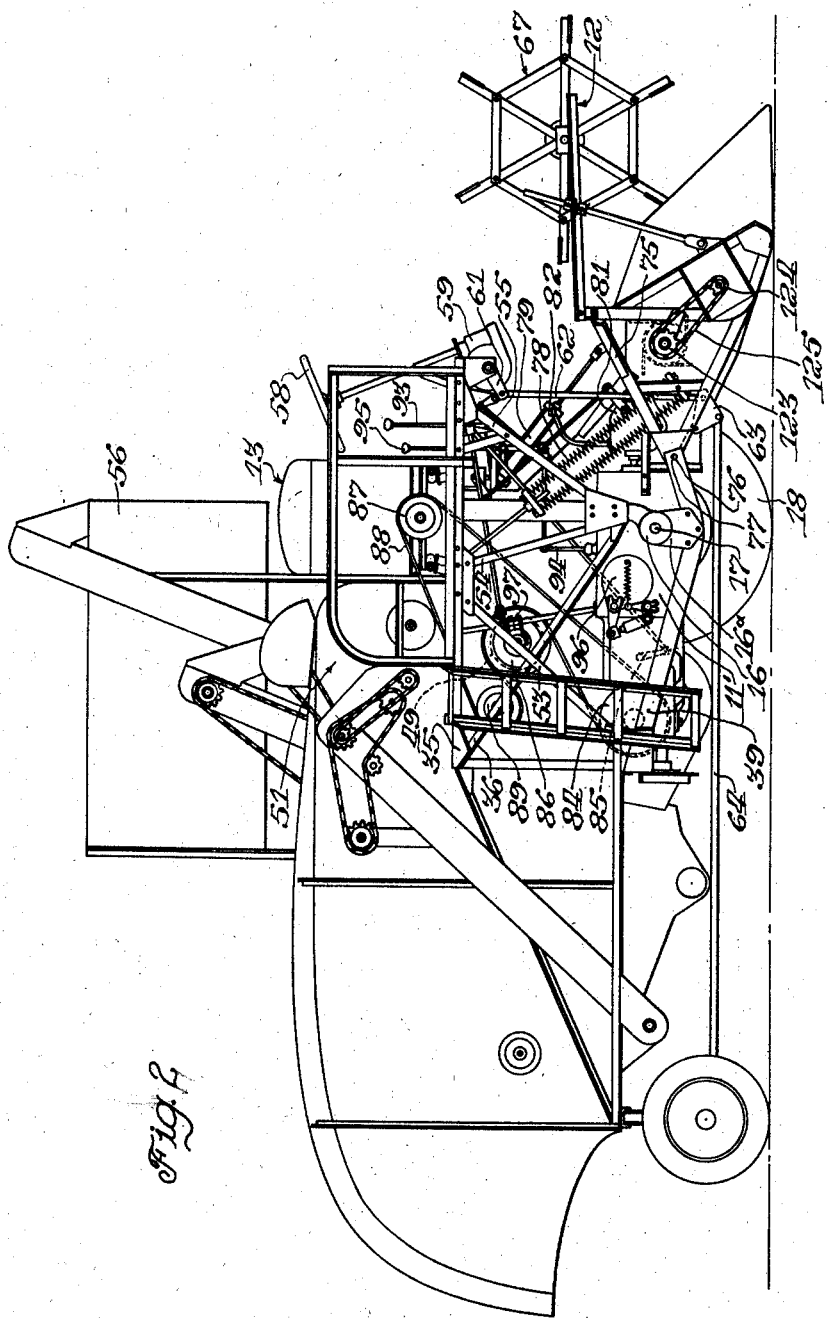
Figure 2 is a side view of the machine, shown in Figure 1, taken from the right side.

Referring now to the drawings and more particularly to Figures 1 and 2, it will be seen that the harvester thresher, chosen to illustrate the principles of the present invention, comprises a wheel supported frame structure 10, separator 11, platform 12, and motor 13.

The wheel supported frame structure 10 comprises a transmission case 11' from which extends an axle housing 14. As shown in Figure 5, the transmission 11 is positioned at one side of the frame 10, and the axle structure 14 extends outwardly to the opposite side of the frame. At the end of the axle structure 14 is secured a casting 15, and a similar casting 16 is secured to the transmission case 11'. An axle 17 extends from the transmission case 11' out through the axle structure 14 beyond the casting 15, and has a drive wheel 18 secured thereon. Another axle 19 extends from the transmission case 11' out through the casting 16, and has a drive wheel 21 secured thereon.

Since the tread of the drive wheels of the harvester thresher must be of sufficient width to prevent the harvester from overturning, there is the problem of supporting the separator on the axle structure of the drive wheels in such a manner that the weight of the separator would not be directly applied to the axle structure, but would instead be carried by the drive wheels of the thresher.

The following novel frame structure has been provided which will support the separator, platform, grain tank, and motor of a self-propelled harvester thresher. The framework 10 consists of a pair of spaced longitudinally disposed channel members 22 and 23 which form an upper frame 23a. A channel member 24 is secured to the casting 15 and extends upwardly and inwardly and is secured at its upper end to the longitudinally disposed channel member 22. A similar channel member 25 is secured to the casting 16 and extends upwardly and inwardly and is secured to the longitudinally disposed channel member 23. A transversely positioned member 26 is secured between the upper ends of the channel members 24 and 25. Between the longitudinally disposed channels 22 and 23 and at the point of connection of the channels 24 and 25 thereto is connected a transversely positioned channel 26a. At the rear of the longitudinally disposed channels 22 and 23 is secured a transverse channel member 27 which extends beyond the members 22 and 23 and has secured at one end thereof a downwardly extending member 28, and at the other end thereof a downwardly extending member 29. The lower ends of the members 28 and 29 are secured to a lower transverse frame structure 31.

The lower transverse frame structure 31 consists of upper and lower angle members 32 and 33 which are secured together by channel members 34 and plates 34a. At each end of the transverse channel member 27 is secured a plate member 35 which has connected thereto angle members 36 and 37 which extend forwardly and downwardly and are connected to the casting members 15 and 16, respectively. The transverse frame structure 31 extends outwardly beyond the longitudinally disposed channels 22 and 23. Downwardly depending portions 15a and 16a are respectively provided on the castings 15 and 16. A longitudinally disposed channel member 38 is connected to the downwardly depending portion 15a on the casting 15 and to one end of the transverse frame structure 31. A similar longitudinally disposed channel member 39 is connected to the downwardly depending portion 16a on the casting 16 and to the other end of the transverse frame structure 31. Alined openings 41 are provided at the forward end of each of the channel members 38 and 39. The rear end of the transmission 11 is supported in a suitable bracket 11a provided at one side of the transverse frame structure 31. A diagonal member 14a is connected to the rear end of the transmission 11 and to the mid-point of the axle 14.

The framework for the separator is supported from the longitudinally disposed channel members 22 and 23, supported on the transverse frame structure 31. This framework consists of a pair of rearwardly extending angle members 42 and 43, which extend rearwardly and are supported on a rear wheeled truck structure 43. The rear end of the angle member 42 is connected to the longitudinal channel member 22 by an angle member 42a, and the rear end of the angle member 43 is connected to the longitudinally disposed channel member 23 by an angle member 43a. The front of the separator 11 is supported on a pair of angles 45 and 46 which extend downwardly from the channel members 22 and 23 and are reenforced with the channel members 24 and 25 by the horizontal angle members 47 and 48.

By this particular frame construction, the entire weight of the harvester thresher is carried by the longitudinally disposed channel members 23 and 22 from which the weight is transferred outwardly by the members 24 and 25 onto the drive wheels 18 and 21. The weight of the harvester thresher is not carried directly on the axle structure 14. The axle structure only holds the frame structure from moving laterally.

Referring now to Figures 2 and 3, it is to be noted that the separator 11 houses the usual threshing cylinder 49. A recleaning mechanism 51 is provided above the usual threshing mechanism, but since neither the threshing mechanism nor the recleaning mechanism constitute a part of the invention, it is not believed necessary to describe them.

The motor 13 is mounted on the longitudinally disposed channel members 22 and 23. An operator's platform 52 is also supported on the channel members 22 and 23 and is braced to the transverse frame structure 31 by the angles 53 and by the angles 54 and 55 which are connected to the castings 15 and 16.

On the operator's platform 49 is provided a grain tank 56, an operator's station 57, a steering wheel 58, and the controls for operating the harvester thresher. The steering wheel 58 extends into a housing 59 in which is provided the usual worm and worm drive assembly with which is associated an arm 61. A rod 62 extends downwardly from the arm 61 and is connected to a bell crank 63 mounted on the front of the transmission case 11. A longitudinally disposed rod 64 is also connected to the bell crank 63 and extends rearwardly and is connected to a steering mechanism 65 provided on the rear wheeled truck structure 43. By this arrangement the operator may steer the harvester thresher from his station 57.

The platform 12 is pivotally mounted on the forwardly extending channel members 38 and 39. It should be noted that the platform 12 is mounted on the frame structure 10 in such a manner that the weight of the platform is also carried by the drive wheels 18 and 21. The platform 12 comprises the usual reel 67 and cutting mechanism 68 which consists of finger guards 69 and reciprocating sickle 71 that cuts the grain. At the rear of the cutting mechanism 68 and at each end of the platform 12 are rotatably mounted open end augers 72 and 73 which convey the grain toward the center of the platform 12 onto a conveyor 74 which extends rearwardly and into the separator 11. Above the conveyor 74 is rotatably mounted a beater 74a which guides the grain onto the conveyor 74. A frame structure 12a is provided to the rear of and at each end of the platform 12 and comprises a pair of converging angle members 75, at the rear end of which are provided alined openings 76. The frame structure 12a is pivotally connected to the longitudinally disposed channel members 38 and 39 by pins 77, which are inserted in the openings 41 in the channel members 38 and 39, and the openings 76 in the angle members 75.

A counterbalancing mechanism 78 is connected to the upper rearwardly converging angle member 68 at each side of the separator 11, and to the frame structure 10 as shown in Figures 2 and 3. The counterbalancing mechanism 78 is connected ahead of the pivot pins 77 and tends to rotate the platform 12 upwardly.

The platform 12 is adjusted by a fluid cylinder device 79 in the form of a cylinder in which is slidably mounted a piston. The cylinder is connected to the frame structure 10 and the piston is connected to the platform 12. A hydraulic pump 81 is associated with and driven from the transmission 11. A conduit 82 extends from the hydraulic pump 81 and is connected to the cylinder of the fluid cylinder device 79. The hydraulic pump 81 is controlled from the pedals 83 positioned near the operator's station 57. Upon moving the foot pedal 83, fluid is pumped into the conduit 82 and thence into the cylinder of the fluid cylinder device 79 which lifts the platform 12 about its pivotal connection to the channel members 38 and 39. The lifting springs 78 aid in lifting the platform 12.

The parts of the harvester thresher and the transmission 11 are driven from the motor 13. The transmission 11 is provided with a pulley 84 which drives the mechanism therein, which in turn rotates the front supporting wheels 18 and 21. A clutch 85 is associated with the pulley 84. The cylinder 49 has a pulley 86 provided at one end thereof. The pulley 86 and the pulley 84 of the transmission 11 are driven from a pulley 87 provided on the motor 13. A suitable belt 88 is trained around the pulleys 84, 86, and 87 and an idler pulley 89, which is adjustable to increase or decrease the tension on the belt 88. By this driving connection, only one belt need be used to drive the operating parts of the thresher, and the transmission which propels the harvester thresher. The pulley 86 which is associated with the cylinder 49 is also controlled through a clutch 91. The clutches 85 and 91 are controlled by the levers 92 and 93 positioned near the operator's station 57. In the event that the cylinder 49 of the machine should be stopped, the lever 93 may be operated, and in the event that the drive to the transmission 11 is to be stopped, the lever 92 may be operated. The transmission 11 is provided with a usual gear shift lever 94, which is controlled through suitable linkage, which in turn is controlled by a remote gear shift lever 95 also positioned near the operator's station 57. A brake 96 is provided on the transmission 11 and is controlled by the foot lever 97 near the operator's station 57.

The various drives for the harvester thresher are taken from the driven cylinder 49 as shown in Figure 3. A chain 98 trained around a sprocket provided on the end of the cylinder shaft 49 extends forwardly and is trained around a sprocket provided on the shaft 99, thence downwardly around an idler sprocket 101, and thence rearwardly around a sprocket 102 provided on the shaft 103. Another sprocket 104 is secured on the shaft 103 around which another chain 105 is trained. The chain 105 drives the straw walker shaft 106, and a chain 107 drives the elevator 108. The chain 105 is trained around a sprocket provided on the shaft 109 from which extends a drive belt 111 that drives the recleaner mechanism 51.

The platform cutting mechanism 68, the reel 67, and the augers 72 and 73 are driven from the chain 98. A sprocket 112 is associated with the chain 98 and has a sprocket 113 secured thereto. A chain 114 is trained around the sprocket 113 and extends forwardly to a sprocket 115 which is provided on a shaft 116 that is mounted on the platform 12. The shaft 116 is positioned on the platform 12 in such a manner that when the platform 12 is pivotally mounted on the pins 77, which are inserted in the alined openings 76 in the longitudinally disposed channels 38 and 39, the shaft 116 will be coaxial or concentric therewith. The shaft 116 also drives the conveyor 74 which conveys the cut grain into the separator 11.

Referring now to Figure 1, the drive for the platform is taken from the shaft 116. On this shaft is provided a sprocket 117 around which is trained a chain 118. At each side and at the rear of the platform 12 are rotatably mounted shafts 119 and 121. The inner ends of the shafts 119 and 121 are connected to the shaft on which the beater 74a is mounted by universal joints 122. A sprocket 123 is provided on the beater shaft around which the chain 118 is trained so as to drive the beater from the shaft 116.

The shafts 119 and 121 extend outwardly toward the ends of the platform 12. On the outer end of the shaft 119 is provided a sprocket 123, and on the journaled portion or outer end of the auger 72 is provided a sprocket 124. A chain 125 trained around the sprockets 123 and 124 drives the auger 72 from the shaft 119.

At the end of the shaft 121 is provided a sprocket 126, and a sprocket 127 is provided on the end of the journaled portion or outer end of the auger 73. A chain 128 trained around the sprockets 126 and 127 drives the auger 73 from the shaft 121. At the outer end of the shaft 121 is also provided a bevel gear 129 which drives the cutting mechanism 68. As shown in Figure 3, a gear 131 provided on the end of the shaft 132 meshes with the gear 129. The shaft 132 is journaled on the outer end of the platform 12 and extends downwardly toward the cutting mechanism 68. On the lower end of the shaft 132 is secured a crank 133 that is connected to the pivotally mounted link 134. The reciprocating sickle 71 is connected to the end of the link 134. Upon rotation of the shaft 132 the link 134 is moved about its pivotal mounting which in turn moves the sickle 71.

In the event a reel is used it may be driven through the chain 128, as shown in Figure 3. A sprocket 135 is mounted on the reel 12 and the chain 128 is trained around the sprockets 126, 127, and 135. A sprocket 136 is associated with the sprocket 135, and a sprocket 137 is secured to the reel shaft 138. A chain 139 is trained around the sprockets 136 and 137.

By this particular driving arrangement for the harvester, a single belt drives the cylinder and the transmission. From the cylinder the operating parts of the harvester thresher are driven, and the augers and cutting mechanism are driven from the driven beater.

From the foregoing description it should be apparent that an improved self-propelled type of harvester thresher has been provided. The novel frame structure supports the separator, motor, grain tank, and platform of the thresher, and the entire weight of the harvester thresher is carried on the drive wheels thereof. The motor, which supplies the power for operating the harvester thresher drives the cylinder shaft and the transmission through a single belt. The drive to the cylinder shaft and the transmission may be stopped at any time by the clutches associated therewith. The drive for the platform is simplified by driving the beater and driving the augers and cutting mechanism from the driven beater.

While only a preferred construction has been described in which the principles of the present invention have been embodied, it is to be understood that the invention is not to be limited to the specific details described, but that, in fact, widely different means may be employed in the practice of the broader aspects of my invention.

What is claimed is:

1. In a harvester thresher, a transverse axle structure having laterally spaced wheels, a frame structure positioned above and intermediate the wheels, and means extending downwardly and outwardly from the frame structure and connected to the axle structure at a point adjacent each of the wheels in a manner to transmit the weight of the frame structure directly onto said wheels.

2. In a harvester thresher, a transverse axle structure having laterally spaced wheels, a frame structure positioned above and intermediate the wheels, means extending downwardly and outwardly from the frame structure and connected to the axle structure at a point adjacent each of the wheels, and a separator supported by the frame structure.

3. In a harvester thresher, a transverse axle structure having laterally spaced wheels, a frame structure positioned intermediate the wheels, means extending downwardly and outwardly from the frame structure and connected to the axle structure at a point adjacent each of the wheels, a separator supported by the frame structure, and a platform pivotally connected to the frame structure at a point adjacent each of the wheels.

4. In a harvester thresher, a transverse axle structure having laterally spaced wheels, a rear wheeled truck, a frame structure positioned intermediate the transverse axle structure and the wheeled truck, means extending downwardly and outwardly from the frame structure and connected to the axle structure at a point adjacent each of the wheels, means connecting the rear of the frame structure to the wheeled truck, and a separator supported by the frame structure.

5. In a harvester thresher, a transverse axle structure having laterally spaced wheels, a rear wheeled truck, a frame structure positioned intermediate the axle structure and the wheeled truck, means extending downwardly and outwardly from the frame structure and connected to the axle structure at a point adjacent each of the wheels, means connecting the rear of the frame structure to the wheeled truck, a separator supported by the frame structure, and a platform pivotally mounted on the frame structure at a point adjacent each of the wheels.

6. In a self-propelled harvester thresher, a transverse axle structure having laterally spaced wheels, a rear wheeled truck, a frame structure positioned intermediate the axle structure, means extending downwardly and outwardly from the front of the frame structure and connected to the transverse axle structure at a point adjacent each of the spaced wheels, means connecting the rear of the frame structure to the wheeled truck, a separator supported by the frame structure between the transverse axle structure and the rear wheeled truck, a platform positioned at the front of the separator and extending laterally to each side thereof and pivotally connected to the frame structure at a point adjacent each of the wheels on the transverse axle structure, and a motor and operator's platform carried by the frame structure.

7. In a self-propelled harvester thresher having a transverse axle structure on which laterally spaced drive wheels are mounted, a wheeled truck, platform, motor, and separator, means for supporting the platform, motor, and separator on the transverse axle structure and the wheeled truck comprising an upper frame, means extending downwardly and outwardly from the upper frame and connected to the transverse axle structure at a point adjacent each of the drive wheels, means extending rearwardly from the upper frame and connected to the wheeled truck, the upper frame and the rearwardly extending means supporting the separator, the motor mounted on the upper frame, and means carried by the upper frame and extending therefrom adjacent each of the drive wheels and secured to the transverse axle structure and having the platform pivotally connected thereto.

8. In a self-propelled harvester thresher having a transverse axle structure having laterally spaced drive wheels, a transmission operatively connected with the axle structure and having a drive pulley, a frame structure positioned above the transverse axle structure, means extending outwardly and downwardly from the frame structure and connected to the axle structure adjacent each of its drive wheels, a motor supported by the frame structure and having a drive pulley, a separator supported by the frame structure and having a rotatable part having a pulley secured thereto, and a belt trained around said pulleys.

9. In a self-propelled harvester thresher having a transverse axle structure having laterally spaced drive wheels, a transmission operatively connected with the axle structure and having a drive pulley, a frame structure positioned above the transverse axle structure, means extending downwardly and outwardly from the frame structure and connected to the axle structure adjacent each of the drive wheels, a motor supported by the frame structure and having a drive pulley alined with the transmission pulley, a separator supported by the frame structure and having a cylinder having a pulley secured thereto in alinement with the transmission pulley and motor pulley, and a belt trained around the motor, cylinder, and transmission pulleys.

10. In a self-propelled harvester thresher having a transverse axle structure having laterally spaced drive wheels, a transmission operatively connected with the axle structure and extending rearwardly thereof and having a drive pulley, a frame structure positioned above the transverse axle structure, means extending from the frame structure and connected to the axle structure adjacent each of the drive wheels, means extending from the frame structure and connected to the rear portion of the transmission, a motor mounted on the frame structure and having a drive pulley alined with the transmission pulley, a separator carried by the frame structure, and having a cylinder having a pulley secured thereto in alinement with the motor and transmission pulleys, and a single belt trained around said pulleys.

11. In a self-propelled harvester thresher having a transverse axle structure having laterally spaced drive wheels, a transmission operatively connected with the axle structure and having a drive pulley, a frame structure positioned above the transverse axle structure, means connecting the frame structure to the axle structure, a motor supported by the frame structure and having a drive pulley, a separator supported by the frame structure and having a rotatable part having a pulley secured thereto, a belt trained around said pulleys, and independently operable clutch means associated with the cylinder and transmission pulleys.

LEE P. MILLARD.
STUART D. POOL.